April 23, 1968 G. D. McTAGGART ET AL 3,379,578
IMMERSION-TYPE THERMOCOUPLE HAVING A SHEATH COMPOSED OF A
SINTERED CERAMIC REFRACTORY
Filed Nov. 19, 1964
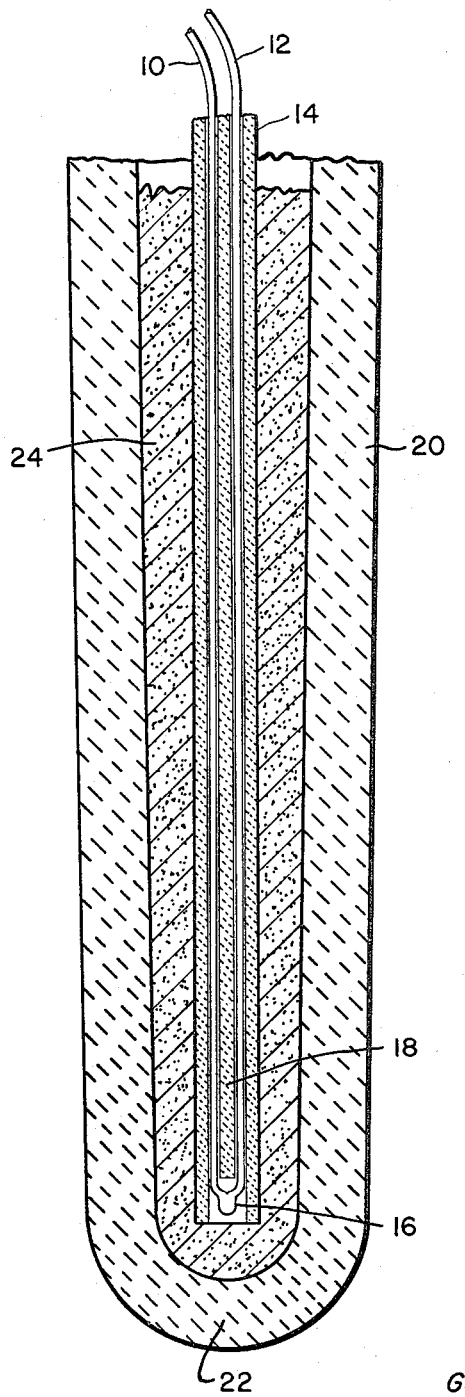
INVENTORS.
George D. McTaggart
Emmerson K. Norman
BY
Richard N. Wardell
ATTORNEY

United States Patent Office 3,379,578
Patented Apr. 23, 1968

3,379,578
IMMERSION-TYPE THERMOCOUPLE HAVING A SHEATH COMPOSED OF A SINTERED CERAMIC REFRACTORY
George D. McTaggart and Emmerson K. Norman, Horseheads, N.Y., assignors to Corhart Refractories Company, Louisville, Ky., a corporation of Delaware
Filed Nov. 19, 1964, Ser. No. 415,559
9 Claims. (Cl. 136—234)

This invention relates to immersion-type thermocouple units for measuring or sensing the temperature of molten materials, particularly molten metals such as those found in open hearth and basic oxygen vessel steelmaking furnaces.

Heretofore immersion-type thermocouple units employed in high temperature molten material processes, such as the steel-making processes, have comprised a thermocouple of noble metal wire elements enclosed in a tubular sheath of fused silica glass. Since the noble metal elements are highly susceptible to contamination in the high temperature processes whereby their accuracy is deleteriously affected, it has been necessary to enclose them in the protective sheath. The sheath necessarily had to withstand the severe thermal shock upon immersion in the molten metal (and slag) bath, to allow the thermocouple junction to attain bath temperature fairly rapidly, and to withstand corrosive attack of the molten material in which it had been immersed for a sufficient time to permit the thermocouple junction to attain bath temperature as well as determination of this latter fact by appropriate instrument connected in an electrical circuit with the thermocouple. The fused silica glass has apparently been the only commercially suitable sheath material for the above requirements and such immersion-type thermocouple units are capable of only a single temperature determination or a very short term temperature determination duration of about a minute or so at most before the hot corrosive and/or erosive attack of the surrounding molten material destroys the sheath and thermocouple.

It is an object of the present invention to provide an immersion-type thermocouple unit that is capable of extended accurate temperature determining ability over relatively long periods of time and, in some cases (e.g. in the basic oxygen vessel processes of steelmaking), for substantially the entire period of one complete sequence of a molten material process (e.g. about 30 minutes to one hour) so as to provide quick, continuous and accurate control of the temperature throughout most of the process. However, it is also an object of this invention to provide novel immersion-type thermocouple units designed to last for more limited periods of time, but with more rapid response in accurately detecting molten material process temperatures. In any event, the units are characterized by a novel combination structure including a highly thermal shock and corrosion-erosion resistant sheath of unique synergistic mineralogical make-up or combination and a buffer material layer filling a space between the sheath of the thermocouple.

Additional objects, features and advantages of the present invention will become apparent, to those skilled in the art, from the following detailed description and the accompanying drawing, in which the sole figure illustrates, in a longitudinal cross-sectional view, one preferred embodiment of an immersion-type thermocouple unit according to the present invention.

Basically the invention comprises:
(1) A refractory sheath comprising a tubular portion and a portion closing one end of the tubular portion, the sheath being composed of a sintered ceramic refractory:
(a) Analytically consisting essentially of, by weight, 3 to less than 15% (preferably 5 to 12%) $TiO_2$, 0.8 to 25% $Cr_2O_3$, 40 to less than 95% (preferably 45 to 92%) MgO, the sum of $TiO_2+Cr_2O_3+MgO$ being at least 75% (preferably at least 80%), up to 15% $Fe_2O_3$, less than 7.5% $Al_2O_3$, less than 2% $SiO_2$ and less than 1% CaO,
(b) Having a homogeneous mineralogy on a macroscopic scale,
(c) Microscopically comprising essentially an intimate, intergrown mixture of periclase crystals and mixed magnesium-spinel crystals with substantial direct mineralogical bonding of these crystals to those adjacent thereto, and at least a major portion of the periclase crystals containing therein fine exsolved magnesium-spinel crystals and discontinuous microcracks,
(2) A thermocouple disposed inside the sheath with the thermocouple junction positioned adjacent the portion closing one end of the tubular portion, and
(3) A refractory buffer layer compactly filling the space between the sheath and the thermocouple, the buffer layer being composed of a basic refractory material analytically comprising essentially at least 90% (preferably at least 95%) by weight MgO.

The sintered ceramic refractory making up the sheath exhibits good resistance to severe thermal shock cracking and/or spalling, and it exhibits good resistance to corrosion-erosion by molten ferrous metals and basic ferruginous slags. These properties result from the synergistic effect of the combined analytical composition plus macroscopic and microscopic mineralogy as set forth above. In particular however, the titanium oxide content is critical to thermal shock resistance. Increasing or decreasing the titanium oxide to a content outside the above-stated limits will substantially destroy the good thermal shock resistance. Also, the discontinuously microcracked periclase crystals are believed to significantly contribute to the thermal shock resistance without materially reducing the strength of the refractory in view of their discontinuous nature. Good corrosion-errosion resistance is dependent upon having the proper combination of magnesium oxide and chromium oxide while keeping harmful impurities (e.g. $Al_2O_3$, $SiO_2$ and CaO) below the indicated limits, and upon the development of the proper macroscopic and microscopic mineralogy.

Another element of the synergistic combination forming the sintered refractory of the sheath is that the macroscopic mineralogy is homogeneous. By mineralogy is meant the usual combination of chemical composition, phases or crystals and their amount, size, distribution and bonding, and porosity and its amount, size and distribution. On a macroscopic scale (as seen by the naked eye without aid of any magnifying device), all the aforementioned structural features appear substantially uniformly alike, i.e. homogeneous, throughout the product or article. This homogeneity is further evident by virtue of the fact that the corrosive molten metals and slags do not recognize any differences along the sintered refractory contacting surface since the corrosive attack is substantially uniform across such entire surface.

The above-described microscopic mineralogy results only by critical and necessary very small particle sizing of the raw batch materials (as will be more fully described below). The greater intimacy of contact between the comminuted particles after being molded into a green body provides the basis for the superior direct and intergrown bond development between adjacent periclase and spinel crystals after the body has been fired and sintered. A greater resulting reactivity of such molded batch materials results in, upon firing, substantial diffusion process activity. Thus, for example, a substantial, or even major, portion of most of the grain boundaries between original magnesite particles is obliterated by such diffusion yielding intergrown periclase crystals whereby at least a majority of the otherwise distinct periclase crystals are all linked as a substantially continuous phase due to the discontinuous grain boundaries therebetween. Furthermore, a substantial amount of spinel-forming oxides diffuse into the periclase crystals as solid solution therein during firing and upon cooling, very fine precipitates of mixed magnesia-spinels form or exsolve within at least a majority of these periclase crystals as well as at portions of their grain boundaries. The latter grain boundary precipitates, as well as the primary magnesium-spinel crystals formed from the original raw material particles (e.g. chrome ore and titania), have a substantial or greater portion of their faces or surfaces abutting in contiguous or direct bond with the faces or surfaces of adjacent periclase or spinel crystals. Because of the low, restricted impurity content of oxides that form low-melting components or phases, there is very little of the latter (e.g. silicates or aluminates mostly in small, scattered or isolated islands) to prevent or hinder the direct bonding between the more refractory crystals. It appears that due to the considerable amount of exsolved spinel crystals included within individual periclase crystals and/or to a substantial number of instances where primary or grain boundary spinel crystals protrude into periclase crystals during the period of cooling after sintering, a significant amount of discontinuous microcracking occurs within at least a majority of these periclase crystals. This apparently is the result of the magnesium-spinel crystals having a smaller coefficient of thermal expansion than that of the periclase crystals and the latter being relatively weak in tension. Hence, the spinel crystals wholly or partially within the periclase crystals shrink slower on cooling than the periclase crystals and cause considerable tension stresses in these periclase crystals, many times resulting in the microcracks. These microcracks are essentially all discontinuous as the result of being physically interrupted, such as by pores, boundaries of exsolved spinel crystals, etc.

The mixed complex magnesium-spinel crystals in the sheath refractory appear to be principally magnesium orthotitanate ($2MgO \cdot TiO_2$) or solid solution of picrochromite ($MgO \cdot Cr_2O_3$) and magnesium orthotitanate. Of course, any iron oxide as $Fe_2O_3$ and any $Al_2O_3$ that are present in the batch materials will substitute for or replace some $Cr_2O_3$ and/or $TiO_2$ in the spinel lattices. Moreover, any iron oxide as FeO present in the batch materials will substitute for or replace some MgO in the lattice of either or both of the periclase and spinel crystals.

In order to obtain the required mineralogy in the refractory sheath, it is necessary to comminute all the raw batch materials, prior to molding and firing, to the degree that substantially all (i.e. at least 99% by weight) particles will pass through a 149 micron opening (e.g. —100 mesh U.S. standard fine series). Substantial amounts of extreme fines should be avoided because they tend to cause excessive firing shrinkage as a result of requiring excessive amounts of molding mediums to provide moldability to the comminuted refractory batch. Generally, particles less than one micron should amount to less than 5% by weight.

The refractory buffer layer is necessary to isolate the thermocouple from the sheath in order to prevent or substantially delay diffusion of contaminants, such as iron, from either the sheath or the molten metal bath into contaminating contact with the thermocouple thereby destroying its calibration and reliability.

Referring now to the accompanying drawing, the invention will be described in greater exemplary detail. A thermocouple is constructed according to convention practice by assembling two thermocouple wires 10, 12 to extend down through two bores in a cylindrical ceramic rod 14 and welding together adjacent ends of the two wires 10, 12 to form a junction 16. In order to accommodate the fused portion or junction 16 within the lowermost portion of rod 14 for greater protection, the lowermost part of the web portion 18 of rod 14 is cut out. The remainder of web portion 18 separates the two bores to electrically insulate one wire from the other. If desired, rod 14 can be substituted by a series of double or single bore ceramic beads threaded on both wires. The rod 14 (or the substituted beads) can be made of any suitable ceramic, for example, sintered alumina, sintered magnesia and the like. Sintered magnesia is preferred because it provides better protection due to its greater refractoriness and chemical resistance in steelmaking environments.

A sheath 20 is forced by any suitable molding technique from appropriate raw materials proportioned to yield the required analytical composition. Preferably mixtures of commercial calcined magnesites, chrome ores and substantially pure titania are pulverized to the required particle size of less than 149 microns and then slip cast to form the tubular sheath 20 with a portion 22 closing one end of sheath 20. Desirably, portion 22 should be hemispherical with uniform wall thickness to minimize thermal shock gradients in the structure that tend to cause premature cracking and/or spalling.

As a specific illustration, the following commercial raw materials have been found suitable for manufacturing the sheath of this invention (typical analysis by weight):

(1) Calcined magnesite—98.45% MgO, 0.66% CaO, 0.16% $SiO_2$, 0.14% $Fe_2O_3$, 0.12% ignition loss;

(2) Transvaal low-silica chrome ore—46.5% $Cr_2O_3$, 26.2% FeO+$Fe_2O_3$, 13.4% $Al_2O_3$, 11.0% MgO, 0.9% $SiO_2$; and (3) Fritmaker's grade titania—99% min. $TiO_2$, 0.01% max. $Fe_2O_3$, 0.20% max. $SO_3$.

These raw materials can be fabricated into sheaths as follows: each material is comminuted to a fine powder in which less than five percent by weight thereof is particles coarser than 44 microns (325 mesh U.S. standard fine series) and less than five percent by weight thereof is particles finer than one micron. A ceramic powder mixture is formed in the following proportions:

| | Parts by weight |
|---|---|
| Calcined magnesite | 924 |
| Chrome ore | 240 |
| Titania | 36 |

A slip is prepared by adding the ceramic powder mixture to a solution of benzene containing paraffin wax as a binder to give handling strength to the green slip cast sheaths and oleic acid as a deflocculant for the ceramic powder. The powder mixture is added to the solution in a ratio of six kilograms of powder to every liter of solution and every liter of solution should contain 50 grams of paraffin wax and 7.5 grams of oleic acid. After thoroughly mixing the slip, it is then cast into appropriately shaped molds and solidified to the desired sheath body. For ease of removal from the mold and for somewhat greater combined thickness of sheath and buffer layer towards the top where it will not hinder the response time, the external surface of the wall of sheath 20 is desirably tapered outwardly from the closed lower end portion 22 toward the upper open end as illustrated in the drawing. The internal surface of the sheath wall can also be similarly tapered so that the buffer layer thickness increases toward the upper open end, but it is preferred to have increasingly greater thickness in the sheath wall toward the upper open end by constructing the internal surface of the sheath wall substantially without any such taper. Finally, the green sheath body is dried by gently heating (e.g. at 65° C.) and then firing at 1600–1800° C. for a time sufficient to develop strongly coherent sintering and bonding of the crystals as described above. Usually a firing period of 18–24 hours is sufficient. Fired bodies made according to the foregoing procedure had: (a) an analytical composition, as calculated by weight, of 3.0% $TiO_2$, 9.5% $Cr_2O_3$, 78.5% MgO, 5.5% $Fe_2O_3$, 2.7% $Al_2O_3$, 0.3% $SiO_2$ and 0.5% CaO, (b) an excellent high degree of direct mineralogical bonding between the intimate, intergrown mixture of periclase and mixed magnesium-spinel crystals with almost all of the periclase crystals containing fine exsolved magnesium-spinel crystals therein and at least a majority of the periclase crystals containing discontinuous microcracks, (c) a high fired density of 3.27 grams per cubic centimeter and (d) a low apparent porosity of 6.67.

In assembling the thermocouple unit, the thermocouple assembly 10, 12, 14, 16 is positioned inside the sheath 20 such that junction 16 is adjacent end portion 22. Preferably, junction 16 is positioned so as to be substantially equidistant from all points on the inside surface of the hemispherical end portion 22. Then the buffer layer 24 is formed either by slip casting calcined magnesite into and filling the annular space between sheath 20 and rod 14 of the thermocouple assembly, or by pouring dry powdered magnesite into the space and vibrating the unit to condense and compact the powdered magnesite buffer layer.

Ultimately the upper end of the thermocouple unit is mounted onto a suitable and/or conventional holder or extension piece (not shown as it forms no part of the present invention) through which conventional lead wires extend to connect the thermocouple in an electrical circuit with an instrumet from which the temperature (or some indication thereof) can be visually observed. Such holder will also provide the means for physically handling and immersing the thermocouple in the molten material bath, as is conventional in the art.

The wires for the thermocouple can be of any known or suitable combination for the temperatures to be measured or sensed. For temperatures up to 1600° C., a combination of platinum and an alloy of platinum with 10–13% rhodium are well known to be capable of proper performance. More recently developed combinations can be used for temperatures above 1600° C. and up to 2000° C., namely, platinum–30% rhodium alloy and platinum–6% rhodium alloy, or iridium and an alloy of iridium with 40–60% rhodium.

The immersion thermocouple units of this invention are structurally sound under the severe thermal shock conditions of immersion and remain reliably accurate for the time it takes the molten contacting materials to corrode-erode through the sheath 20 and buffer layer 24 (and in some cases the rod 14), and then contaminate the thermocouple wires and/or junction.

It will be appreciated that the invention is not limited to the specific details shown in the example and illustration, except insofar as specified in the claims, and that various changes or modifications may be made within the scope of the invention as would be apparent of those of ordinary skill in the art.

We claim:

1. An immersion-type thermocouple unit comprising
  (a) a refractory sheath comprising a tubular portion and a portion closing one end of said tubular portion, said sheath being composed of a sintered ceramic refractory:
    (1) analytically consisting essentially of, by weight, 3 to less than 15% $TiO_2$, 0.8 to 25% $Cr_2O_3$, 40 to less than 95% MgO, the sum of $TiO_2+Cr_2O_3+MgO$ being at least 75%, up to 15% $Fe_2O_3$, less than 7.5% $Al_2O_3$, less than 2% $SiO_2$ and less than 1% CaO,
    (2) having a homogeneous mineralogy on a macroscopic scale,
    (3) microscopically comprising essentially an intimate, intergrown mixture of periclase crystals and mixed magnesium-spinel crystals with substantial direct mineralogical bonding of these crystals to those adjacent thereto, and at least a major portion of the periclase crystals containing therein fine exsolved magnesium-spinel crystals and discontinuous microcracks,
  (b) a thermocouple disposed inside the sheath with the thermocouple junction positioned adjacent said portion closing one end of said tubular portion, and
  (c) a refractory buffer layer compactly filling the space between the sheath and the thermocouple, the buffer layer being composed of a basic refractory material analytically comprising essentially at least 90 weight percent MgO.

2. The immersion-type thermocouple unit of claim 1 wherein said thermocouple includes two thermocouple wires with adjacent ends thereof fused together to form a junction and a ceramic rod having two longitudinal bores therethrough, each of said wires extending through one of said bores, and said junction positioned in a recessed portion of one end of said rod.

3. The immersion-type thermocouple unit of claim 2 wherein said rod is composed essentially of magnesia.

4. The immersion-type thermocouple unit of claim 2 wherein said portion closing one end of said tubular portion is hemispherical in shape.

5. The immersion-type thermocouple unit of claim 4 wherein said tubular portion tapers outwardly toward the end opposite said one end, and the wall thickness of said hemispherical shaped portion and of said tubular portion is substantially the same throughout said sheath.

6. An immersion-type thermocouple unit comprising
  (a) a refractory sheath comprising a tubular portion and a hemispherical portion closing one end of said tubular portion, said sheath being composed of sintered ceramic refractory:
    (1) analytically consisting essentially of, by weight, 5 to 12% $TiO_2$, 0.8 to 25% $Cr_2O_3$, 45 to 92% MgO, the sum of $TiO_2+Cr_2O_3+MgO$ being at least 80%, up to 15% $Fe_2O_3$, less than 7.5% $Al_2O_3$, less than 2% $SiO_2$ and less than 1% CaO,
    (2) having a homogeneous mineralogy on a macroscopic scale,
    (3) microscopically comprising essentially an intimate, intergrown mixture of periclase crystals and mixed magnesium-spinel crystals with substantial direct mineralogical bonding of these crystals to those adjacent thereto, and at least a major portion of the periclase crystals containing therein fine exsolved magnesium-spinel crystals and discontinuous microcracks,
  (b) a thermocouple comprising two thermocouple wires with adjacent ends thereof fused together to form a junction and a ceramic rod having two longitudinal bores therethrough, each of said wires extending through one of said bores, said junction positioned in a recessed portion of one end of said rod, said thermocouple disposed inside said sheath with said junction positioned adjacent said hemispherical portion, and
  (c) a refractory buffer layer compactly filling the space between the sheath and the thermocouple, the buffer layer being composed of a basic refractory material analytically comprising essentially at least 95 weight percent MgO.

7. The immersion-type thermocouple unit of claim 6 wherein said buffer layer is compacted granular magnesia.

8. The immersion-type thermocouple unit of claim 6 wherein said buffer layer is slip cast magnesia.

9. The immersion-type thermocouple unit of claim 6 wherein said rod is composed essentially of magnesia.

No references cited.

ALLEN B. CURTIS, *Primary Examiner.*
WINSTON A. DOUGLAS, *Examiner.*
A. M. BEKELMAN, *Assistant Examiner.*